US011260538B2

(12) United States Patent
Wang et al.

(10) Patent No.: US 11,260,538 B2
(45) Date of Patent: Mar. 1, 2022

(54) ROBOT TRAINING SYSTEM INCLUDING A MOTION BAR

(71) Applicant: Flexiv Ltd., Santa Clara, CA (US)

(72) Inventors: Shiquan Wang, Foster City, CA (US); Xuesen Li, San Mateo, CA (US)

(73) Assignee: Flexiv Ltd., Grand Cayman (KY)

( * ) Notice: Subject to any disclaimer, the term of this patent is extended or adjusted under 35 U.S.C. 154(b) by 161 days.

(21) Appl. No.: 16/545,229

(22) Filed: Aug. 20, 2019

(65) Prior Publication Data

US 2020/0061843 A1    Feb. 27, 2020

Related U.S. Application Data

(60) Provisional application No. 62/721,341, filed on Aug. 22, 2018.

(51) Int. Cl.
*B25J 13/08* (2006.01)
*B25J 9/16* (2006.01)

(52) U.S. Cl.
CPC ............. *B25J 13/088* (2013.01); *B25J 9/163* (2013.01)

(58) Field of Classification Search
CPC . B25J 13/088; B25J 9/163; B25J 13/02; B25J 9/0081; G05B 2219/39439; G05B 19/425
USPC .................................................. 700/245–264
See application file for complete search history.

(56) References Cited

U.S. PATENT DOCUMENTS

| | | | | |
|---|---|---|---|---|
| 6,697,681 B1* | 2/2004 | Stoddard | ............... | B25J 9/1656 700/17 |
| 7,654,670 B2* | 2/2010 | Mimura | ................ | A61B 3/028 351/208 |
| 8,326,469 B2* | 12/2012 | Phillips | ................ | G05D 1/0088 701/2 |
| 9,043,031 B1* | 5/2015 | Gardner | ............... | G05D 1/0022 700/264 |
| 9,981,378 B2* | 5/2018 | Kogan | ..................... | B25J 9/161 |
| 10,099,383 B2* | 10/2018 | Riedel | .................... | B25J 9/1689 |
| 10,571,902 B2* | 2/2020 | Aldridge | ............ | G05B 19/4097 |
| 2004/0193957 A1* | 9/2004 | Swoboda | ............... | G06F 11/261 714/30 |
| 2005/0141681 A1* | 6/2005 | Graiger | ................ | G05B 19/409 379/90.01 |

(Continued)

FOREIGN PATENT DOCUMENTS

| CN | 104002305 | 8/2014 |
|---|---|---|
| CN | 105549417 | 5/2016 |

(Continued)

OTHER PUBLICATIONS

International Search Report for International Application No. PCT/CN2019/101827, dated Nov. 21, 2019, (9 pages).

*Primary Examiner* — Jaime Figueroa
(74) *Attorney, Agent, or Firm* — K&L Gates LLP (57) ABSTRACT

A teaching system for a robot is provided, including a motion bar for controlling the robot and a robot system utilizing the teaching system. In one embodiment, the teaching system is provided including a first controller configured to provide motion-related control functions for controlling motion of the robot. The teaching system may also include a second controller configured to provide control functions other than the motion-related control functions for programming one or more actions of the robot.

16 Claims, 7 Drawing Sheets

(56) References Cited

U.S. PATENT DOCUMENTS

| | | | | |
|---|---|---|---|---|
| 2008/0027590 A1* | 1/2008 | Phillips | ............... | G05D 1/0088 |
| | | | | 701/2 |
| 2009/0079939 A1* | 3/2009 | Mimura | ............... | A61B 3/0033 |
| | | | | 351/245 |
| 2013/0023052 A1* | 1/2013 | Tanaka | ............... | G02B 21/32 |
| | | | | 435/461 |
| 2014/0305987 A1* | 10/2014 | Parihar | ............... | A61B 17/068 |
| | | | | 227/175.2 |
| 2015/0174767 A1* | 6/2015 | Som | ............... | G05B 19/409 |
| | | | | 700/257 |
| 2016/0001176 A1* | 1/2016 | Chen | ............... | A63F 13/24 |
| | | | | 463/37 |
| 2016/0114478 A1* | 4/2016 | Wu | ............... | B25J 13/006 |
| | | | | 700/264 |
| 2016/0297067 A1* | 10/2016 | Kogan | ............... | B25J 13/02 |
| 2016/0297076 A1* | 10/2016 | Riedel | ............... | B25J 9/1689 |
| 2018/0101166 A1* | 4/2018 | Aldridge | ............... | B25J 9/1664 |
| 2018/0168622 A1* | 6/2018 | Shelton, IV | ............... | A61B 17/072 |
| 2018/0345506 A1* | 12/2018 | Riedel | ............... | B25J 13/06 |

FOREIGN PATENT DOCUMENTS

| | | |
|---|---|---|
| CN | 106041968 | 10/2016 |
| CN | 106041969 | 10/2016 |
| CN | 106965199 | 7/2017 |
| JP | 2007190663 | 8/2007 |
| JP | 2016060018 | 4/2016 |
| WO | 20010171878 | 9/2001 |
| WO | 2014127822 | 8/2014 |

* cited by examiner

ROBOT TRAINING SYSTEM INCLUDING A MOTION BAR

CROSS-REFERENCE TO RELATED APPLICATIONS

The present application claims the benefit of priority under 35 U.S.C. § 119(e) to U.S. Provisional Patent Application Ser. No. 62/721,341, entitled "MULTIPURPOSE, SAFE, AND FLEXIBLE ROBOT-HUMAN INTERFACE" and filed on Aug. 22, 2018, the disclosure of which is herein incorporated by reference in its entirety.

TECHNICAL FIELD

The present disclosure generally relates to the field of robot control technology, and in particular to a training system for a robot, a motion bar for controlling a robot, and a robot system implementing the same.

BACKGROUND

Figure 1:
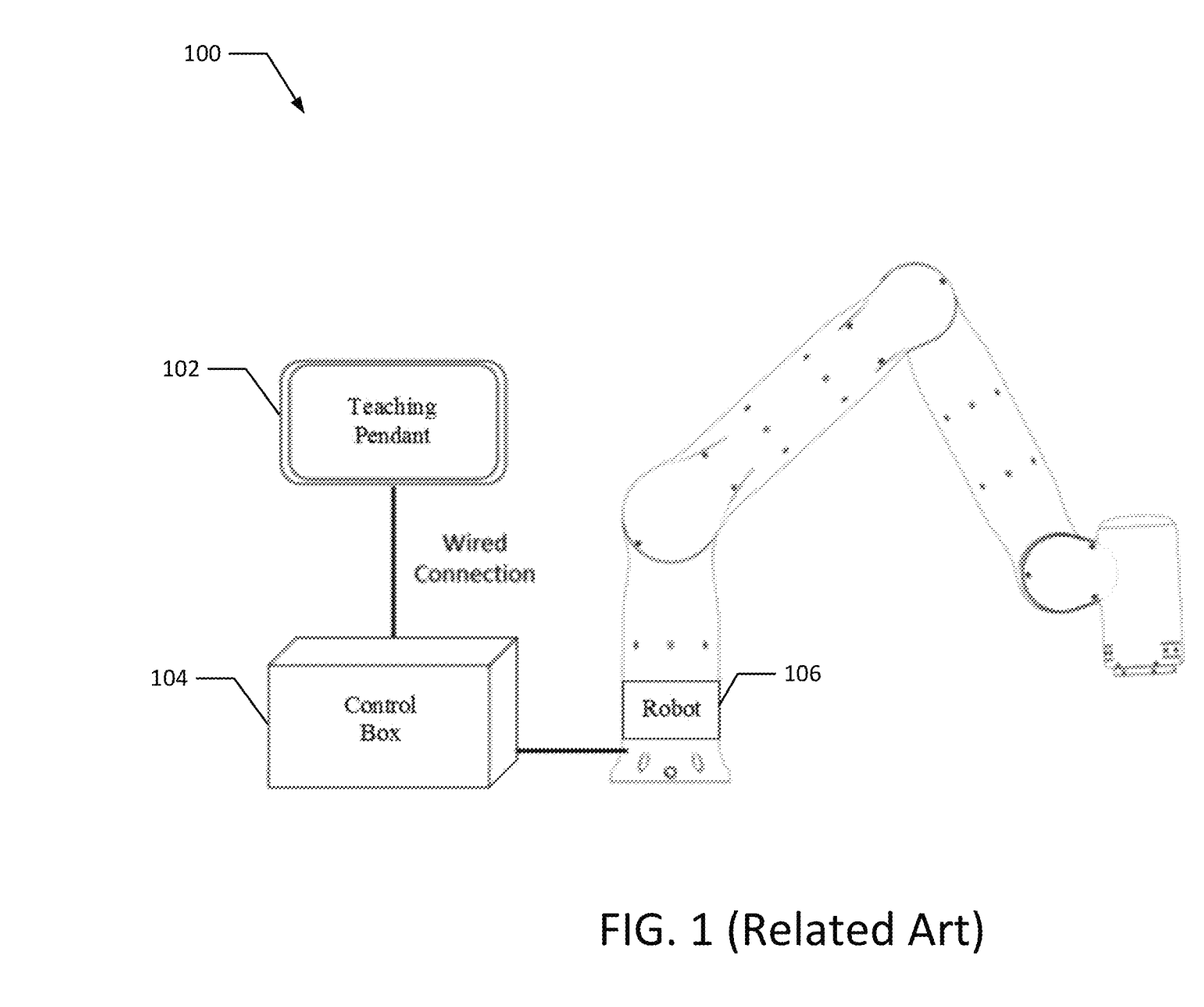
FIG. 1 illustrates a robotic system of related art.

Industrial robot systems are generally equipped with teaching pendants for robot control and programming. To comply with safety requirements, an emergency-stop button, an enabling button, and a wired cable connection must typically be included on the teaching pendant because the teaching pendant can directly trigger motion of the robot. For example, FIG. 1 depicts a robot system setup 100 including a teaching pendant 102 connected to a control box 104, which is connected to a robot 106.

Additional safety requirements may require that teaching pendants 102 may be pass certain destructive tests, such as drop tests, tumbling tests, and heavy set down tests. Therefore, teaching pendants 102 usually include extra layers of protection to fulfill these safety requirements, which typically lead to bulky and heavy teaching pendant designs.

These safety requirements may also make it difficult to use existing user interface (UI) devices, such as phones and tablet computers.

SUMMARY

The present disclosure presents new and innovative systems and methods to control and program a robot, including a new design concept for a robot system teaching pendant. These systems and methods enable flexibility in teaching pendant design and configuration, while maintaining compliance with the relevant safety requirements.

In one embodiment, a teaching system for a robot is provided comprising a first controller configured to provide motion-related control functions for controlling motion of the robot and a second controller configured to provide control functions other than the motion-related control functions for programming one or more actions of the robot.

In another embodiment, the first controller comprises an elongated body and a plurality of functional buttons installed on the elongated body. The plurality of functional buttons may include an emergency stop button configured to stop motion of the robot when pressed and an enabling button configured to enable movement of the robot when pressed. The plurality of functional buttons may also include a multifunction button configured (i) to control the robot to perform a programmed motion-related function and (ii) to be reprogrammable such that the programmed motion-related function may be changed. The plurality of functional buttons may further includes a rotary switch configured to switch the robot between different operation modes and a joystick configured to perform a corresponding function based on a current operation mode of the robot selected from the different operation modes.

In a further embodiment, the different operation modes of the robot comprise an idle mode, a running mode, a floating mode, a debugging mode, and a user interface mode.

In yet another embodiment, when the current operation mode of the robot is the user interface mode, the joystick is configured to control the second controller as a remote controller.

In a still further embodiment, when the current operation mode of the robot is the debugging mode, the joystick is configured to provide direct manipulation of individual joints of the robot.

In another embodiment, the teaching system further comprises a control box configured to receive user input from the first controller and the second controller and to generate control commands for controlling the robot based, at least in part, on the user input.

In a further embodiment, the first controller is connected to the control box via a cable.

In yet another embodiment, the second controller is wirelessly connected to the control box.

In a still further embodiment, the second controller is a mobile phone or a tablet computer.

In another embodiment, the second controller further comprises a holding component for attaching the first controller to the second controller.

In a further embodiment, the first controller is attached to an end effector of the robot by using one or both of a mechanical interlock or a magnetic interlock between the first controller and the end effector of the robot.

In yet another embodiment, a motion bar is provided for controlling a robot. The motion bar may comprise an elongated body and a plurality of functional buttons for performing motion-related functions installed on the elongated body. The plurality of functional buttons may include an emergency stop button configured to stop motion of the robot when pressed and an enabling button configured to enable movement of the robot when pressed. The plurality of functional buttons may further include a multifunction button configured (i) to control the robot to perform a programmed motion-related function and (ii) to be reprogrammable such that the programmed motion-related function may be changed. The plurality of functional buttons may still further include a rotary switch configured to switch the robot between different operation modes and a joystick configured to perform a corresponding function based on a current operation mode of the robot selected from the different operation modes.

In a still further embodiment, the different operation modes of the robot comprise an idle mode, a running mode, a floating mode, a debugging mode and a user interface mode.

In another embodiment, when the current operation mode of the robot is the user interface mode, the joystick is configured to control the second controller as a remote controller. Alternatively or additionally, when the current operation mode of the robot is the debugging mode, the joystick is configured to provide direct manipulation of individual joints of the robot.

In a further embodiment, the motion bar is communicatively coupled to the robot via a cable.

In yet another embodiment, a robot system is provided comprising at least one sub-system, each of the at least one sub-system comprising a robot and a control box configured to generate control commands for the robot. Each of the eat least one sub-system may further comprise a motion bar configured to provide motion-related control functions for controlling motion of the robot, where the motion bar is communicatively coupled to the control box via a cable and a wireless user interface capable of communicating with the at least one sub-system on an ad-hoc manner, and configured to provide control functions other than the motion-related control functions.

In a still further embodiment, the motion bar comprises an elongated body and a plurality of functional buttons installed on the elongated body. The plurality of functional buttons may include an emergency stop button configured to immediately stop motion of the robot when pressed and an enabling button configured to enable movement of the robot when pressed. The plurality of functional buttons may also include a multifunction button configured (i) to control the robot to perform a programmed motion-related function and (ii) to be reprogrammable such that the programmed motion-related function may be changed. The plurality of functional buttons may further include a rotary switch configured to switch the robot between different operation modes and a joystick configured to perform a corresponding function based on a current operation mode of the robot selected from the different operation modes.

In another embodiment, the different operation modes of the robot comprise an idle mode, a running mode, a floating mode, a debugging mode and a user interface mode.

In a further embodiment, when the current operation mode of the robot is the user interface mode, the joystick is configured to control the second controller as a remote controller. Additionally or alternatively, when the current operation mode of the robot is the debugging mode, the joystick is configured to provide direct manipulation of individual joints of the robot.

In yet another embodiment, the wireless user interface is a mobile phone or a tablet computer.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

To more clearly explain the technical solutions in the embodiments of the present disclosure, the drawings used in the description of the embodiments will be briefly described below. The drawings in the following description are merely exemplary embodiments of the present disclosure. For those of ordinary skill in the art, other drawings may also be obtained based on these drawings without any creative work.

DETAILED DESCRIPTION

The disclosure will now be described in detail with reference to the accompanying drawings and examples. As will be apparent to one skilled in the art, the embodiments described in the present disclosure are merely exemplary and represent only a subset of all such embodiments. In particular, all other embodiments obtained by a person of ordinary skill in the art based on the embodiments of the present invention without creative efforts fall within the scope of the present disclosure.

One way to resolve the problems with conventional teaching pendants is to replace the teaching pendant with a motion bar and a wireless user interface (WLUI) designed to provide the same function as the teaching pendant in a robot system. For example, functions that directly trigger motion of the robot may only be executed with the motion bar, while the WLUI implements all other non-motion-related functions. This divided implementation may comply with teaching pendant safety requirements while also reducing the design constraints created by the safety requirements.

Figure 2:
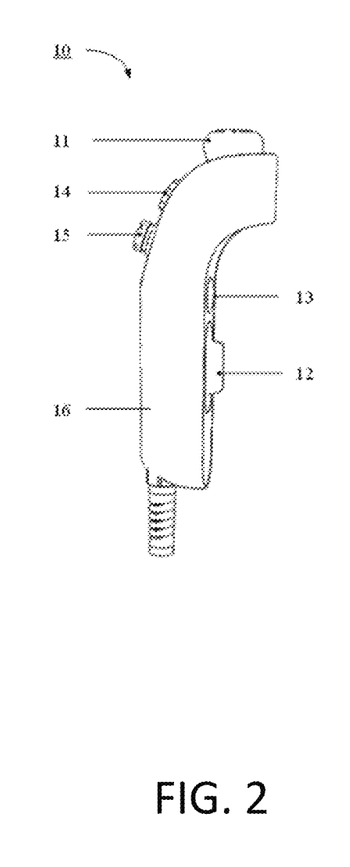
FIG. 2 illustrates a side view of a motion bar according to an exemplary embodiment of the present disclosure.
Figure 3:
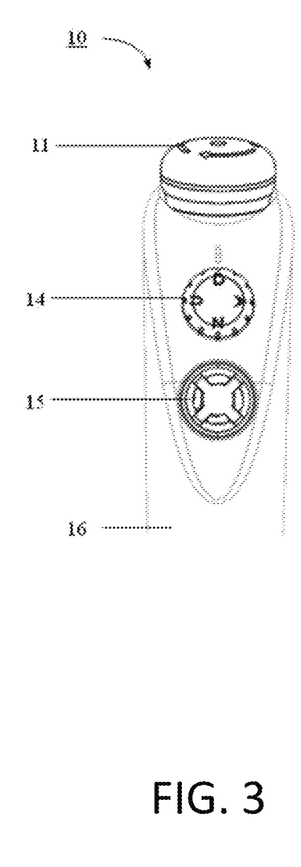
FIG. 3 illustrates a front view of a motion bar according to an exemplary embodiment of the present disclosure.

FIGS. 2 and 3 depict a motion bar 10 according to an exemplary embodiment of the present disclosure. The motion bar 10 may provide control to a robot system in compliance with safety requirements and may also allow for direct manipulation of the WLUI. As depicted, the motion bar 10 may include a body 16 and multiple functional buttons arranged on the body 16. As shown in FIG. 2, the body 16 may have an elongated configuration. The functional buttons may include, for example, an emergency stop button 11, an enabling button 12, a multifunction button 13, a rotary switch 14, and a joystick 15.

The emergency stop button 11 may be provided to improve the safety of the robot system. For example, pressing the emergency stop button 11 may stop (e.g., immediately stop) all movement of the robot system (e.g., the robot 106) in the event of an emergency. In certain implementations, the emergency stop button 11 may also be required by relevant safety requirements.

The enabling button 12 may be similarly provided to improve the safety of the robot system. For example, movement of the robot system (e.g., the robot 106) may be disabled until the enabling button 12 is pressed, and may be stopped again when the enabling button 12 is released. In certain implementations, the enabling button 12 may also be required by relevant safety requirements.

The multifunction button 13 may be configured to perform multiple functions (e.g., movement-related functions), depending on the use case. For example, the multifunction button 13 may be reprogrammable by the WLUI. In certain implementations, the multifunction button 13 may be configured to act as a 'Start' button of the robot system that causes the robot system to begin performing a programmed function.

The rotary switch 14 may be used to switch between different operating modes of the robot system. For example, it may allow for switching between an Idle Mode, a Running Mode, a Floating Mode, a Debugging Mode, and a User Interface Mode.

The joystick 15 may be configured to perform multiple functions based on the operating mode of the robot system. In one implementation, the joystick 15 may control the WLUI under User Interface Mode as a remote controller and may provide direct manipulation of individual joints of the robot system under Debugging Mode. In another implementation, the joystick 15 may control the end effector of the robot system in Cartesian coordinates.

Figure 4:
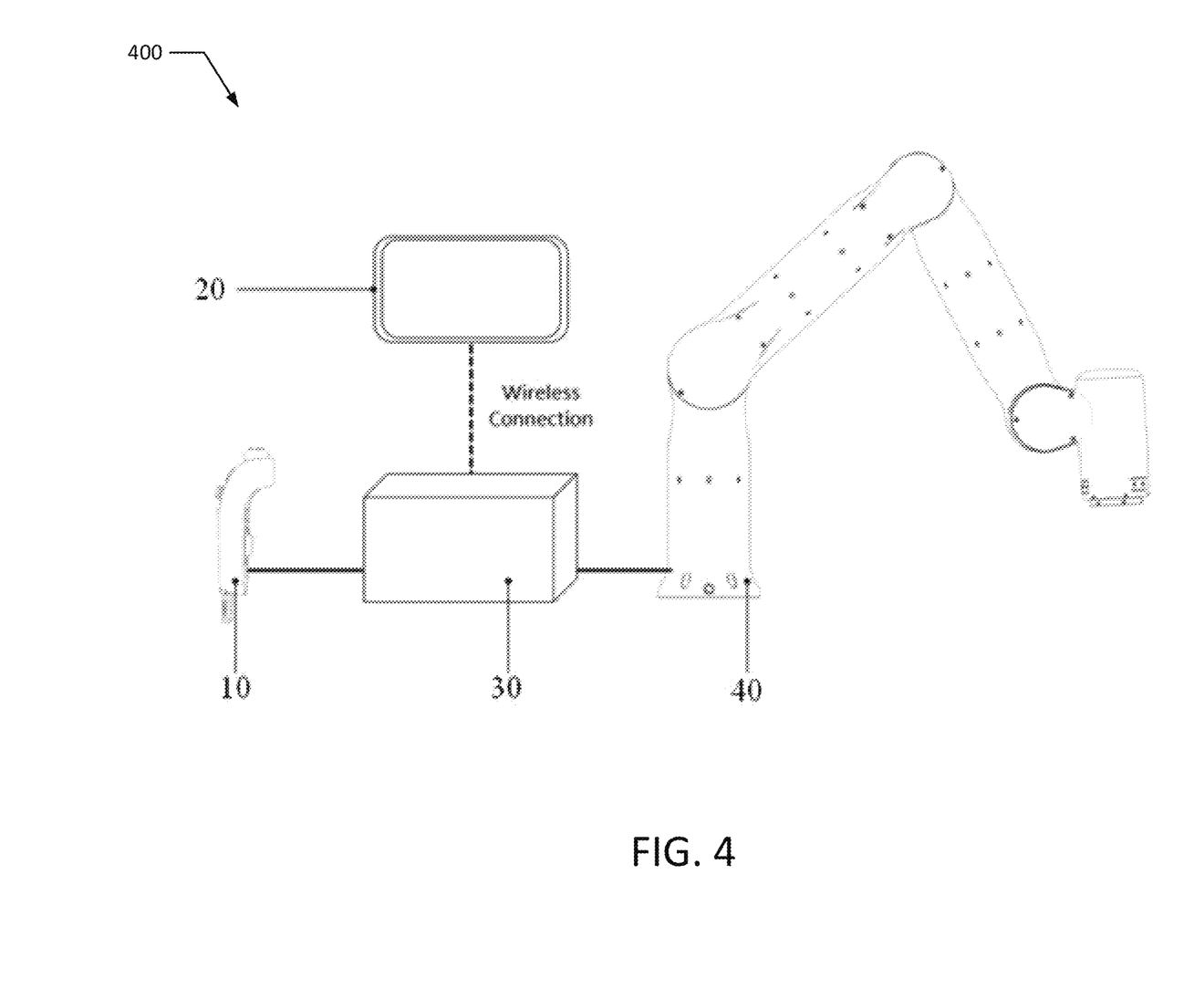
FIG. 4 illustrates a robotic system according to an exemplary embodiment of the present disclosure.

FIG. 4 depicts a robotic system 400 according to an exemplary embodiment of the present disclosure. The robotic system may include a motion bar 10, a wireless user interface (WLUI) 20, a control box 30, and a robot 40.

The control box 30 may act as the hub of the robot system, where all user input (either from the motion bar 10 or from the WLUI 20) is received, and all control commands are generated. The robot 40 may be a robotic arm that performs tasks specified by users. The motion bar 10 may be connected to the control box 30 via a cable or wire, which may be required by certain safety requirements. A wired connection may provide a more stable and reliable connection than a wireless connection and may thus be required by certain safety regulations.

By contrast, the WLUI 20 may be wirelessly connected to the control box 30, e.g., via Wi-Fi. Such a wireless connection may provide more flexibility to the user as a result of potentially more compact form factor and cable-free designs for the WLUI 20. In certain implementations, the wireless connection between the control box 30 and the WLUI 20 may also enable sharing of a single WLUI 20 across multiple robot systems 400. Users may be able to perform tasks such as programming, debugging, and monitoring on the WLUI 20, similar to what can be performed on a regular teaching pendant.

With this design, because safety-related features, such as the emergency stop and enabling buttons 11 and 12, are not performed by the WLUI 20, the applicable safety requirements, such as drop tests and heavy set down test, may be less stringent. This relaxing of the safety requirements may allow for a more compact and elegant design for the WLUI 20. On the other hand, the motion bar 10 may be easier to design to meet the relevant safety requirements because of its lighter weight as compared to traditional teaching pendants.

Figure 5:
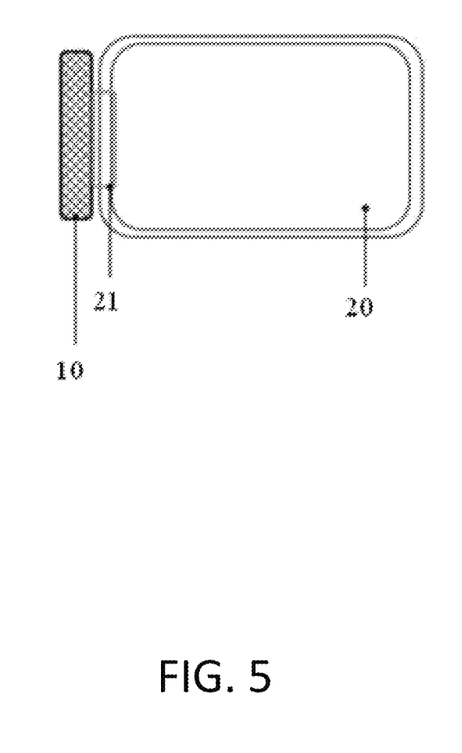
FIGS. 5-7 illustrate additional configurations of a motion bar, a wireless user interface, and a robot according to some embodiments of the present disclosure.
Figure 6:
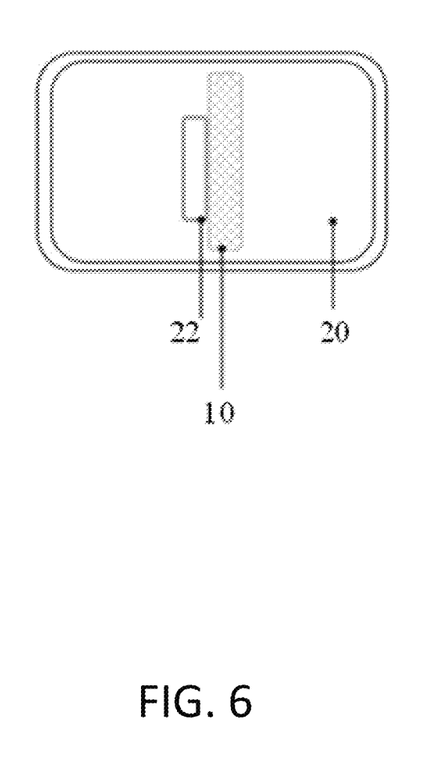
Figure 7:
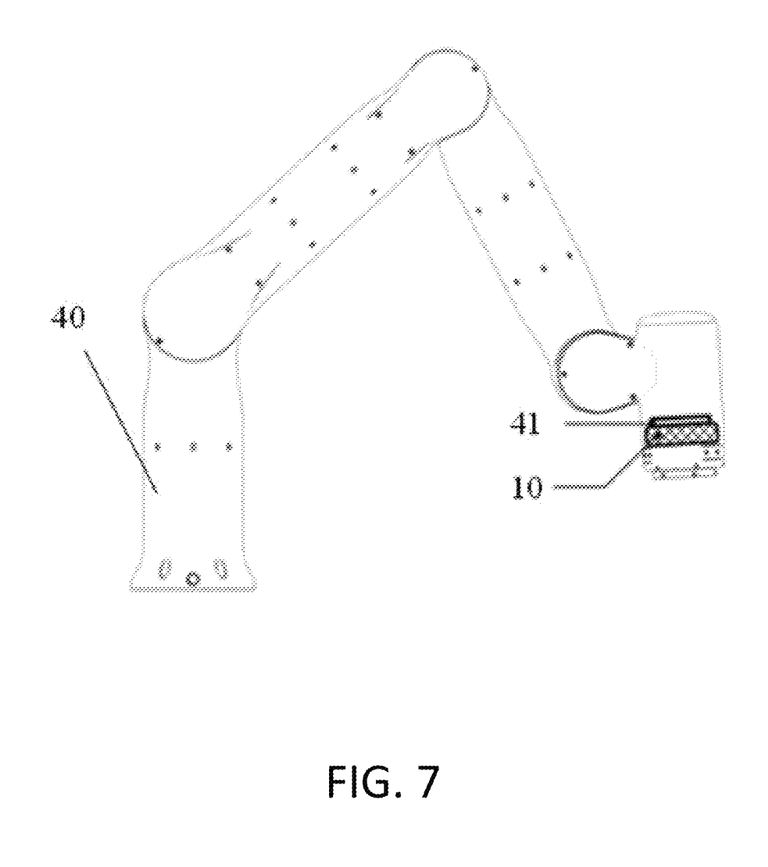

The motion bar 10 can also be integrated into or stored along with the WLUI 20 or the robot 40 according to certain user requirements. FIGS. 5-7 depict several such configurations of the motion bar 10, the wireless user interface 20, and/or the robot 40 according to exemplary embodiments of the present disclosure. One of these configurations may be selected for several reasons, including convenience, aesthetics, safety, and tidiness.

In one implementation, users may need to hold both the WLUI 20 and the motion bar 10 at the same time for robot control and programming. The motion bar and the WLUI may thus be coupled together as one assembly with a motion bar—WLUI holder. For example, FIG. 5 depicts a motion bar—WLUI holder 21 that stores the motion bar 10 alongside the WLUI 20. As another example, FIG. 6 depicts a motion bar—WLUI holder 22 that stores the motion bar 10 behind the WLUI 20. Although not depicted, in another configuration, the motion bar 10 may be stored at the bottom of the WLUI 20.

In a further implementation, users may need to move or position the robot 40 by hand (i.e., in the Floating Mode). In such implementations, the enabling button 11 on the motion bar 10 may have to be held at all time for safety reasons. In practice, this may require two-handed operation. To resolve this manipulation difficulty, the motion bar 10 may be attached to the robot 40 itself, as depicted in FIG. 7 (e.g., using a mechanical interlock or a magnetic interlock between the motion bar 10 and the robot 40). In such a configuration, users may need only one hand to hold the enabling button 11 and move the robot 40 at the same time, which may make the robot 40 easier to operate in the Floating Mode.

Figure 8:
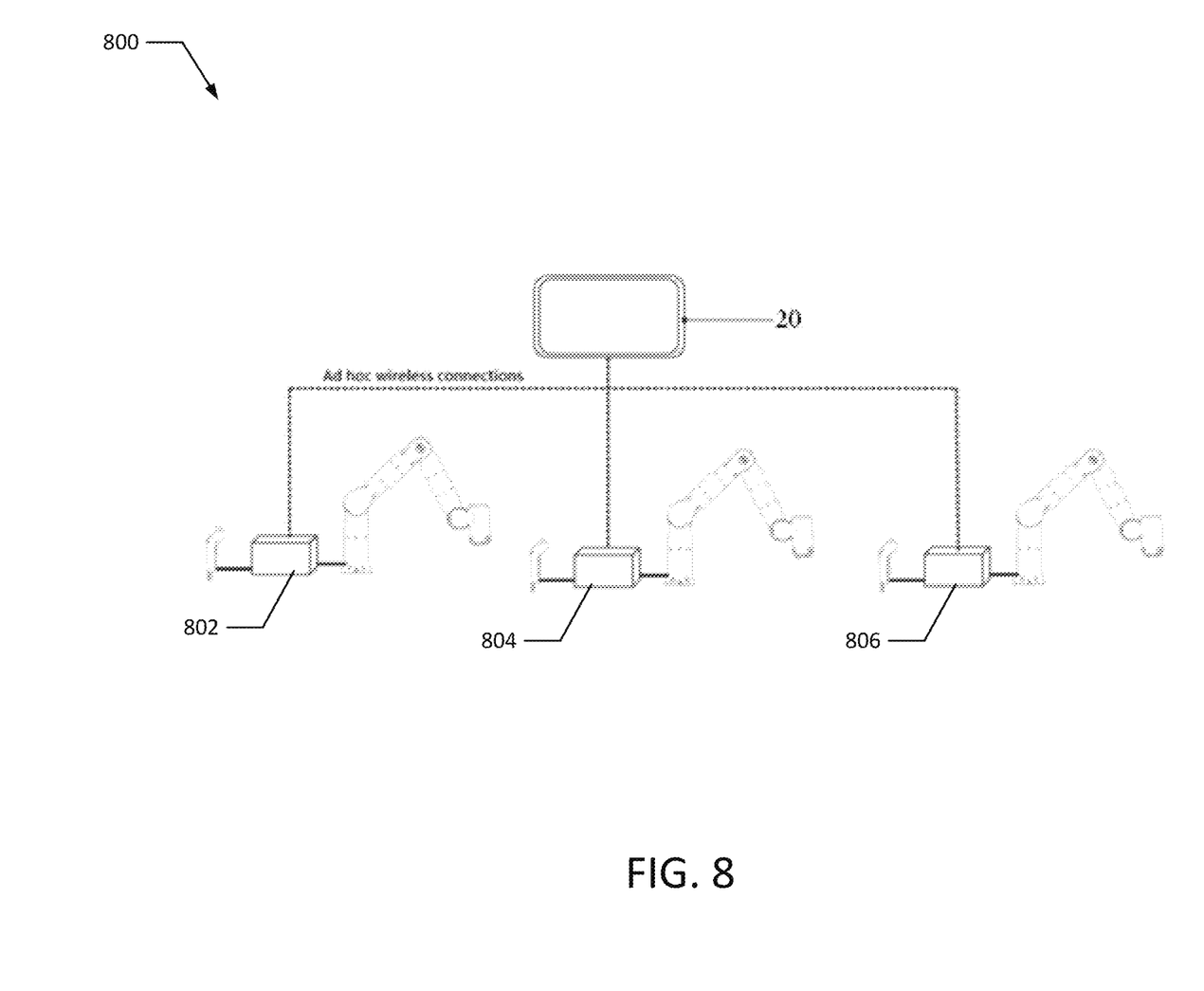
FIG. 8 illustrates a multi-robot system according to an exemplary embodiment of the present disclosure.

FIG. 8 depicts a multi-robot system 800 according to an exemplary embodiment of the present disclosure. The multi-robot system 800 may be used to wirelessly connect the WLUI 20 to different robot systems 802, 804, 806 in an ad-hoc manner. For example, when programming, debugging, or maintenance of a particular robot system is required, users may connect the WLUI 20 to a particular robot system 802, 804, 806 and may then perform the required tasks using the WLUI 20. Such configurations may reduce the total number of WLUIs 20 needed, thereby reducing the overall cost of a deployment in the field (e.g., in a factory utilizing multiple robots).

For consumer applications, smart phones or tablets can also act as WLUIs 20 without compromising the safety requirements. This enables remote programming and control of the robots and brings extra flexibility for the users.

Figure 9:
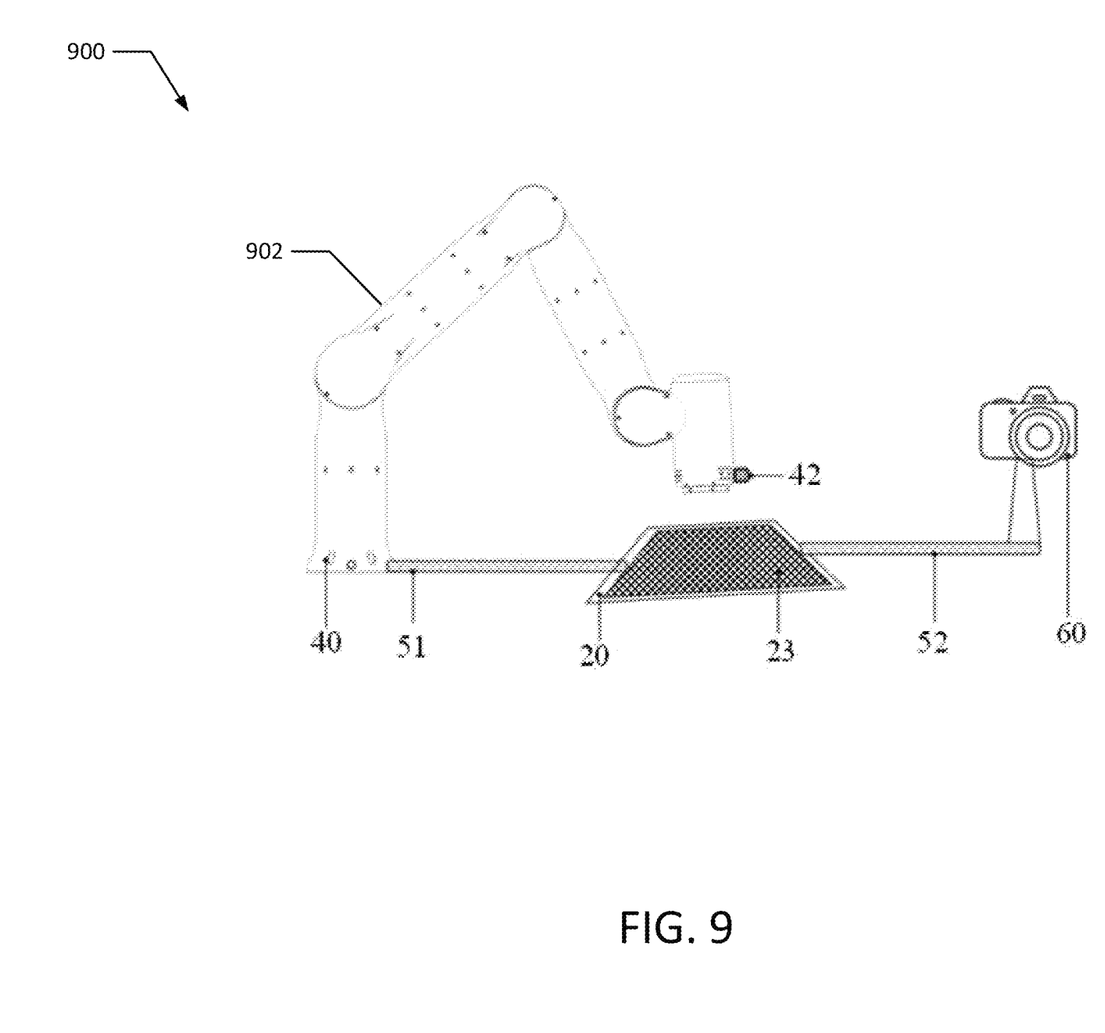
FIG. 9 illustrates a vision calibration system according to an exemplary embodiment of the present disclosure.

FIG. 9 depicts a vision calibration system 900 according to an exemplary embodiment of the present disclosure. Robotic systems 902 may, in certain implementations and as illustrated, include an end effector visual system 42 (e.g., a camera) attached to an end effector of the robot 40 and/or a separate camera near the robot system 902. The WLUI 20 may also be used as a visual calibration device for the robotic system 902 as a result of its portability and real-time wireless connection to the robotic system 902.

For example, in one embodiment, as shown in FIG. 9, the WLUI 20 may be placed beneath the end effector vision system 42 of a robot 40. A pattern 23 (e.g., a checkered pattern or similar) may be displayed on the WLUI 20 with a pre-known grid size. The end effector vision system 42 may then capture the patterns 23 on the WLUI 20 and calculate the associated kinematic parameters of the end effector relative to the robotic system 902. In addition, the WLUI 20 may display various displayed patterns, or may calibrate in separate locations or separate orientations to achieve more accurate calibration results.

Further, a global vision system 60 may be placed near the WLUI 20 to provide an overall visual view of the robotic system 902. With the same WLUI 20 and patterns 23, the global vision system 60 may be calibrated using similar methods as mentioned above. Since both the end effector vision system 42 and the global vision system 60 are calibrated with respect to the WLUI 20, the relative locations between the end effector visual system 42 and the global vision system 60 may be calculated accordingly.

In certain implementations, one or more jigs 51, 52 may be used to directly fix the relative locations between the robot 40 and the WLUI 20, and between the global vision system 60 and the WLUI 20 during calibration. This may enable faster and more convenient calibration between the robot 40, the end effector vision system 42, and the global vision system 60.

The above-discussed systems and methods have one or more of the following benefits: (1) more flexible teaching pendant design with the same level of safety compliance; (2) direct control of the robot system with the motion bar; (3) reduced difficulty for robot vision system calibration; (4) reduced number of teaching pendants in the field; and (5) reduced overall cost.

The foregoing are merely embodiments of the present disclosure, and are not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A teaching system for a robot, comprising:
   a first controller configured to provide motion-related control functions for controlling motion of the robot;
   a second controller configured to provide control functions other than the motion-related control functions for programming one or more actions of the robot;
   a rotary switch configured to switch the robot between different operation modes comprising a debugging mode and at least one of an idle mode, a running mode, a floating mode, and/or a user interface mode; and
   a joystick configured to perform a corresponding function based on a current operation mode of the robot selected from the different operation modes, wherein, when the current operation mode of the robot is the debugging mode, the joystick is configured to provide direct manipulation of individual joints of the robot.

2. The teaching system of claim 1, wherein the first controller comprises an elongated body and a plurality of functional buttons installed on the elongated body, the plurality of functional buttons comprising:
   an emergency stop button configured to stop motion of the robot when pressed;
   an enabling button configured to enable movement of the robot when pressed; and
   a multifunction button configured (i) to control the robot to perform a programmed motion-related function and (ii) to be reprogrammable such that the programmed motion-related function may be changed.

3. The teaching system of claim 1, wherein, when the current operation mode of the robot is the user interface mode, the joystick is configured to control the second controller as a remote controller.

4. The teaching system of claim 1, further comprising a control box configured to receive user input from the first controller and the second controller and to generate control commands for controlling the robot based, at least in part, on the user input.

5. The teaching system of claim 4, wherein the first controller is connected to the control box via a cable.

6. The teaching system of claim 4, wherein the second controller is wirelessly connected to the control box.

7. The teaching system of claim 1, wherein the second controller is a mobile phone and/or a tablet computer.

8. The teaching system of claim 1, wherein the second controller further comprises a holding component for attaching the first controller to the second controller.

9. The teaching system of claim 1, wherein the first controller is attached to an end effector of the robot by using one or both of a mechanical or magnetic interlock between the first controller and the end effector of the robot.

10. A motion bar for controlling a robot, comprising an elongated body and a plurality of functional buttons for performing motion-related functions installed on the elongated body, wherein the plurality of functional buttons comprise:
    an emergency stop button configured to stop motion of the robot when pressed;
    an enabling button configured to enable movement of the robot when pressed;
    a multifunction button configured (i) to control the robot to perform a programmed motion-related function and (ii) to be reprogrammable such that the programmed motion-related function may be changed;
    a rotary switch configured to switch the robot between different operation modes comprising a debugging mode and at least one of an idle mode, a running mode, a floating mode, and/or a user interface mode; and
    a joystick configured to perform a corresponding function based on a current operation mode of the robot selected from the different operation modes, wherein, when the current operation mode of the robot is the debugging mode, the joystick is configured to provide direct manipulation of individual joints of the robot.

11. The motion bar of claim 10, wherein, when the current operation mode of the robot is the user interface mode, the joystick is configured to control a controller as a remote controller.

12. The motion bar of claim 10, wherein the motion bar is communicatively coupled with the robot via a cable.

13. A robot system, comprising:
    at least one sub-system comprising:
        a robot;
        a control box configured to generate control commands for the robot; and
        a motion bar configured to provide motion-related control functions for controlling motion of the robot, wherein the motion bar is communicatively coupled to the control box via a cable the motion bar comprising:
            a rotary switch configured to switch the robot between different operation modes comprising a debugging mode and at least one of an idle mode, a running mode, a floating mode, and/or a user interface mode; and
            a joystick configured to perform a corresponding function based on a current operation mode of the robot selected from the different operation modes, wherein, when the current operation mode of the robot is the debugging mode, the joystick is configured to provide direct manipulation of individual joints of the robot; and
    a wireless user interface capable of communicating with the at least one sub-system on an ad-hoc manner, and configured to provide control functions other than the motion-related control functions.

14. The robot system of claim 13, wherein the motion bar further comprises an elongated body and a plurality of functional buttons installed on the elongated body, the plurality of functional buttons comprising:
    an emergency stop button configured to stop motion of the robot when pressed;
    an enabling button configured to enable movement of the robot when pressed; and
    a multifunction button configured (i) to control the robot to perform a programmed motion-related function and (ii) to be reprogrammable such that the programmed motion-related function may be changed.

15. The robot system of claim 13, wherein when the current operation mode of the robot is the user interface mode, the joystick is configured to control a controller as a remote controller.

16. The robot system of claim 13, wherein the wireless user interface is a mobile phone or a tablet computer.

* * * * *